US012729827B2

United States Patent

(12) United States Patent
Wei et al.

(10) Patent No.: US 12,729,827 B2
(45) Date of Patent: Sep. 8, 2026

(54) THROUGH LAMP FOR VEHICLE AND VEHICLE HAVING SAME

(71) Applicant: BEIJING CHEHEJIA AUTOMOBILE TECHNOLOGY CO., LTD., Beijing (CN)

(72) Inventors: Yun Wei, Beijing (CN); Ge Hao, Beijing (CN); Yu Li, Beijing (CN)

(73) Assignee: BEIJING CHEHEJIA AUTOMOBILE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/708,846

(22) PCT Filed: Nov. 7, 2022

(86) PCT No.: PCT/CN2022/130431
§ 371 (c)(1),
(2) Date: May 9, 2024

(87) PCT Pub. No.: WO2023/083150
PCT Pub. Date: May 19, 2023

(65) Prior Publication Data

US 2025/0003569 A1 Jan. 2, 2025

(30) Foreign Application Priority Data

Nov. 10, 2021 (CN) ........................ 202122749537.6

(51) Int. Cl.
*F21S 43/50* (2018.01)
*F21S 43/30* (2018.01)
(Continued)

(52) U.S. Cl.
CPC ............... *F21S 43/51* (2018.01); *F21S 43/30* (2018.01); *F21S 45/50* (2018.01);
(Continued)

(58) Field of Classification Search
CPC ....... F21Y 2115/10; F21S 43/15; F21S 43/14; F21S 43/265; F21S 43/237; F21S 43/253; F21S 43/31; F21W 2104/00; B60R 13/04
See application file for complete search history.

(56) References Cited

U.S. PATENT DOCUMENTS 3,514,589 A 5/1970 Huber
7,246,403 B2 * 7/2007 Ohyama .................. B60S 1/32 340/468
(Continued)

FOREIGN PATENT DOCUMENTS

CN 210485572 5/2020
CN 210740285 6/2020
(Continued)

OTHER PUBLICATIONS

WIPO, International Search Report and Written Opinion for PCT/CN2022/130431, Feb. 10, 2023.
(Continued)

*Primary Examiner* — Omar Rojas Cadima
(74) *Attorney, Agent, or Firm* — Hodgson Russ LLP

(57) ABSTRACT

A through lamp for a vehicle includes an exterior trim panel provided with a light-transmitting area; a mounting bracket arranged on an inner surface of the exterior trim panel, a lamp chamber being defined between the mounting bracket and the inner surface of the exterior trim panel; and a light-emitting assembly arranged in the lamp chamber. Light emitted by the light-emitting assembly is emitted outwards through the light-emitting area.

15 Claims, 2 Drawing Sheets

(51) Int. Cl.

| | |
|---|---|
| ***F21S 45/50*** | (2018.01) |
| *F21W 103/10* | (2018.01) |
| *F21W 104/00* | (2018.01) |
| *F21Y 115/10* | (2016.01) |

(52) U.S. Cl.
CPC ..... *F21W 2103/10* (2018.01); *F21W 2104/00* (2018.01); *F21Y 2115/10* (2016.08)

(56) References Cited

U.S. PATENT DOCUMENTS

| | | | | |
|---|---|---|---|---|
| 7,585,095 B1 | 9/2009 | Sheriff | | |
| 8,251,558 B1 * | 8/2012 | Hubert | F21S 41/148 | 362/427 |
| 2007/0091632 A1 * | 4/2007 | Glovatsky | F21S 41/145 | 362/547 |
| 2008/0239743 A1 * | 10/2008 | McFadden | F21V 29/763 | 362/520 |
| 2013/0141931 A1 * | 6/2013 | Mathieu | G02B 27/143 | 362/516 |
| 2017/0241616 A1 * | 8/2017 | Nakashima | F21S 43/245 | |

FOREIGN PATENT DOCUMENTS

| | | |
|---|---|---|
| CN | 111637418 | 9/2020 |
| CN | 211780836 | 10/2020 |
| CN | 212777180 | 3/2021 |
| CN | 213840820 | 7/2021 |
| CN | 216814034 | 6/2022 |
| DE | 102005060400 | 6/2007 |
| DE | 102017006440 | 2/2018 |
| DE | 102018005317 | 1/2020 |
| EP | 2508384 | 10/2012 |
| EP | 3825601 | 5/2021 |
| JP | 2019036512 | 3/2019 |

OTHER PUBLICATIONS

EPO, Extended European Search Report for EP Application No. 22891944.5, Feb. 6, 2025.

EPO, Communication for EP Application No. 22891944.5, Oct. 6, 2025.

* cited by examiner

THROUGH LAMP FOR VEHICLE AND VEHICLE HAVING SAME

CROSS-REFERENCE TO RELATED APPLICATIONS

This application is a U.S. National Stage entry under 35 U.S.C. § 371 of International Application No. PCT/CN2022/130431, filed on Nov. 7, 2022, which claims priority to Chinese Patent Application Serial No. 202122749537.6, filed on Nov. 10, 2021, the entire disclosures of which are incorporated herein by reference.

FIELD

The present disclosure relates to the field of automobile technologies, and in particular to a through lamp for a vehicle and a vehicle having the same.

BACKGROUND

A through lamp generally extends along a width direction of a vehicle and through left and right lamps of the vehicle, and its shape is continuous, which may not only serve as a position lamp, but also serve as an appearance part to enhance an upscale feeling of the whole vehicle.

SUMMARY

A through lamp for a vehicle of embodiments of the present disclosure includes an exterior trim panel provided with a light-transmitting area: an mounting bracket arranged on an inner surface of the exterior trim panel, a lamp chamber being defined between the mounting bracket and the inner surface of the exterior trim panel; and a light-emitting assembly arranged in the lamp chamber. Light emitted by the light-emitting assembly is emitted outwards through the light-transmitting area.

Embodiments of the present disclosure also provide a vehicle having the through lamp for the vehicle as described above. The vehicle includes a through lamp, and the through lamp is a through lamp for the vehicle in any of the above embodiments.

DETAILED DESCRIPTION

Figure 1:
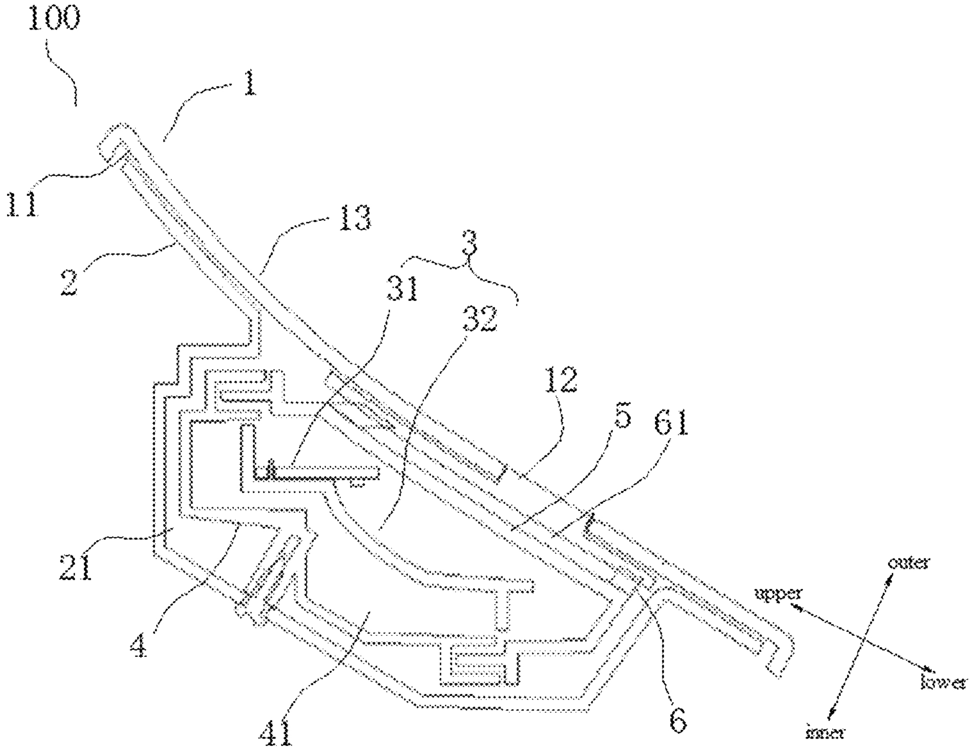
FIG. 1 is a sectional schematic diagram of a through lamp for a vehicle according to an embodiment of the present disclosure.

Embodiments of the present disclosure are described in detail below; and examples of embodiments are illustrated in accompanying drawings. Embodiments described below with reference to the accompanying drawings are illustrative and are intended to be used to explain the present disclosure, and cannot be understood as limitation of the present disclosure.

In the related art, the through lamp that extends along the width direction of the vehicle has a large weight. In order to fix the through lamp more firmly; the through lamp needs to be coupled to a sheet metal member of the vehicle with higher strength, and a part of the through lamp coupled to the sheet metal member requires to have higher structural strength, which results in a limitation on an mounting position of the through lamp, and simultaneously, a high harm value of the through lamp to human body when a collision occurs.

A through lamp 100 for a vehicle in embodiments of the present disclosure includes an exterior trim panel 1, a mounting bracket 2, and a light-emitting assembly 3. The exterior trim panel 1 is provided with a light-transmitting area 12. The mounting bracket 2 is arranged at an inner surface 11 of the exterior trim panel 1, and a lamp chamber 21 is defined between the mounting bracket 2 and the inner surface 11 of the exterior trim panel 1. The light-emitting assembly 3 is arranged in the lamp chamber 21, and the light emitted by the light-emitting assembly 3 is emitted outwards through the light-transmitting area 12.

Specifically, as illustrated in FIG. 1, the mounting bracket 2 is mounted at the inner side of the exterior trim panel 1, the mounting bracket 2 defines a groove, and the exterior trim panel 1 closes the groove and forms the lamp chamber 21. The exterior trim panel 1 is provided with the light-transmitting area 12, and the light-emitting assembly 3 is arranged inside the lamp chamber 21. The light emitted by the light-emitting assembly 3 is emitted to the outside through the light-transmitting area 12.

In embodiments of the present disclosure, it should be understood that the meaning of the exterior trim panel is a component that constitute an outline of the vehicle. For example, the exterior trim panel may be a bumper trim panel, an engine hood panel, or a wiper cover panel. The wiper cover panel covers at least a portion of a wiper, and the wiper cover panel may be mounted on an end of the engine hood panel near a windshield. The through lamp for the vehicle in embodiments of the present disclosure not only may serve as a position lamp but also eliminates a lampshade of a traditional through lamp by mounting the mounting bracket and the light-emitting assembly on the exterior trim panel of the vehicle, which is thereby light-weight and cost-effective.

By reducing weight, embodiments of the present disclosure need not necessarily be mounted on a sheet metal with high structural strength, and have a more flexible mounting position. In addition, embodiments of the present disclosure need not use a high-strength connector to support its weight, and causes minor harm to human body when the collision occurs. It should be noted that the present disclosure does not limit mounting and coupling manners between the mounting bracket 2 and the exterior trim panel 1. For example, the mounting bracket 2 and the exterior trim panel 1 may be coupled by a screw; or may be coupled by coupling manners of welding, riveting, adhering, or snap-fit.

In some embodiments, the light-emitting assembly 3 includes a light source 31 and a light guiding member, and the light guiding member is configured to guide the light emitted by the light source 31 to the light-transmitting area 12. In this way, the light source may guide the light emitted by the light source to the light-transmitting area without directly facing the light-transmitting area when mounted in the lamp chamber, thereby facilitating flexible arrangement of the light source in the lamp chamber.

It should be noted that embodiments of the present disclosure does not limit the type of the light source. For example, the light source may be an LED lamp or a laser lamp.

In some embodiments, the light guiding member is a reflecting mirror 32, and the reflecting mirror 32 is adapted to reflect the light of the light source 31 to the light-transmitting area 12.

Specifically; as illustrated in FIG. 1, the reflecting mirror 32 is coupled to the mounting bracket 2, the light source 31 is mounted at an upper side of the reflecting mirror 32, and the light-transmitting area 12 is located at a lower side of the light source. The light emitted by the light source 31 is reflected by the reflecting mirror 32 to the light-transmitting area 12 located at the lower side of the light source 31. In this way, when the light-transmitting area is made of a transparent material, only the light reflected by the reflecting mirror may be seen from the outside of the through lamp, and the light source and a circuit coupled to the light source cannot be seen. Therefore, the uniformity of the light emitted from the light-transmitting area may be improved.

It may be understood that the light source 31 may also be arranged at the lower side of the reflecting mirror 32, and the light-transmitting area 12 is located at the upper side of the light source 31. At this time, the light emitted by the light source is reflected by the reflecting mirror to the light-transmitting area located at the upper side of the light source.

In some embodiments, the light guiding member is a light guide, and the light source 31 is arranged at at least one end of the light guide. The light guide is provided with a light guiding tooth, and the light guiding tooth is configured to emit the light in the light guide towards an outside of the light guide.

Specifically, the light guide (not illustrated) extends in a left and right direction orthogonal to an upper and lower direction and an inner and outer direction, and the light guiding tooth is (not illustrated) arranged at an inner side of the light guide. An end of the light guide is provided with the light source 31, and the light emitted by the light source 31 may be propagated in the left and right direction along an inner wall of the light guide and emitted towards the outside of the light guide at the light guiding tooth. In this way, only arranging the light source at the end of the light guide may completely illuminate the light-transmitting area.

It should be noted that the light source 31 may be arranged at one end of the light guide or at two ends of the light guide, which is not limited in the present disclosure.

In some embodiments, a plurality of light guides are provided, the plurality of light guides are spaced apart, and the light source 31 is arranged at at least one end of any one of the plurality of light guides.

Specifically; the light guide includes the plurality of light guides coupled end to end and extend in the left and right direction, and the light source 31 is arranged at a junction of any two light guides of the plurality of light guides. The light emitted by the light source 31 is extended in the left and right direction via the inner wall of the light guide and emitted towards the outside of the light guide at the light guiding tooth. In this way, short light guides may be used for splicing to achieve the light guidance effect of a long light guide.

Figure 3:
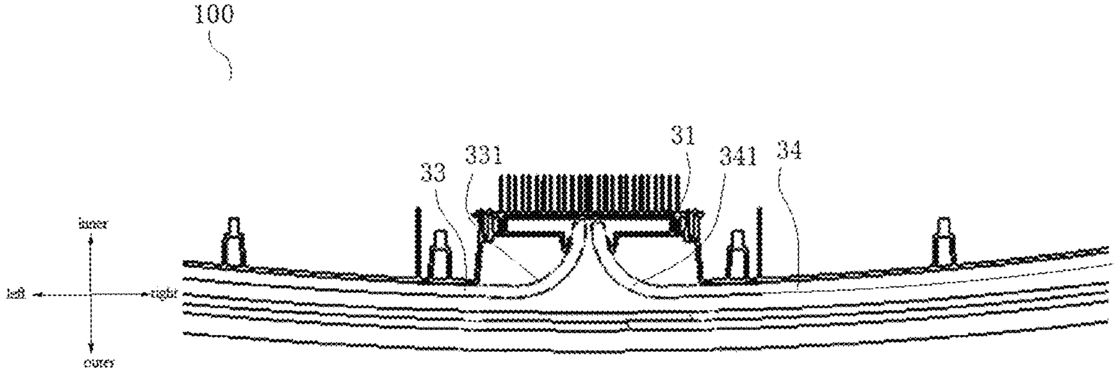
FIG. 3 is a sectional schematic diagram of a through lamp for a vehicle according to yet another embodiment of the present disclosure.

Furthermore, as illustrated in FIG. 3, the light guide includes a first light guide 33 and a second light guide 34 spaced apart along the left and right direction. The first light guide 33 and the second light guide 34 extend substantially along the left and right direction. A second end of the first light guide 33 is coupled to a first end of the second light guide 34. The second end of the first light guide 33 has a first bending portion 331 bent inwards, and the first end of the second light guide 34 has a second bending portion 341 bent inwards. The light source 31 is arranged at an inner side of the first bending portion 331 and the second bending portion 341. A part of the light emitted by the light source 31 propagates towards a left and right extended part of the first light guide 33 via the first bending portion 331, and emits towards an outside of the first light guide 33 at the light guiding tooth. Another part of the light emitted by the light source 31 propagates towards a left and right extended part of the second light guide 34 via the second bending portion 341, and emits towards an outside of the second light guide 34 at the light guiding tooth. In this way, the light emitted by the light source may be emitted towards the light-transmitting area through the light guide, and the uniformity of the light may be improved.

In some embodiments, the light-emitting assembly 3 includes a reflecting rack 35 and the light source 31. The reflecting rack 35 has a reflecting groove 351 with an opening facing the light-transmitting area, and the reflecting groove 351 is configured to reflect the light emitted by the light source 31 in a direction of the opening of the reflecting groove 351. The light source 31 is arranged away from an end of the opening of the reflecting rack 35. A groove bottom of the reflecting groove 351 defines a through hole 352, and the light emitted by the light source 31 is emitted from the through hole 352 towards the light-transmitting area 12.

Figure 2:
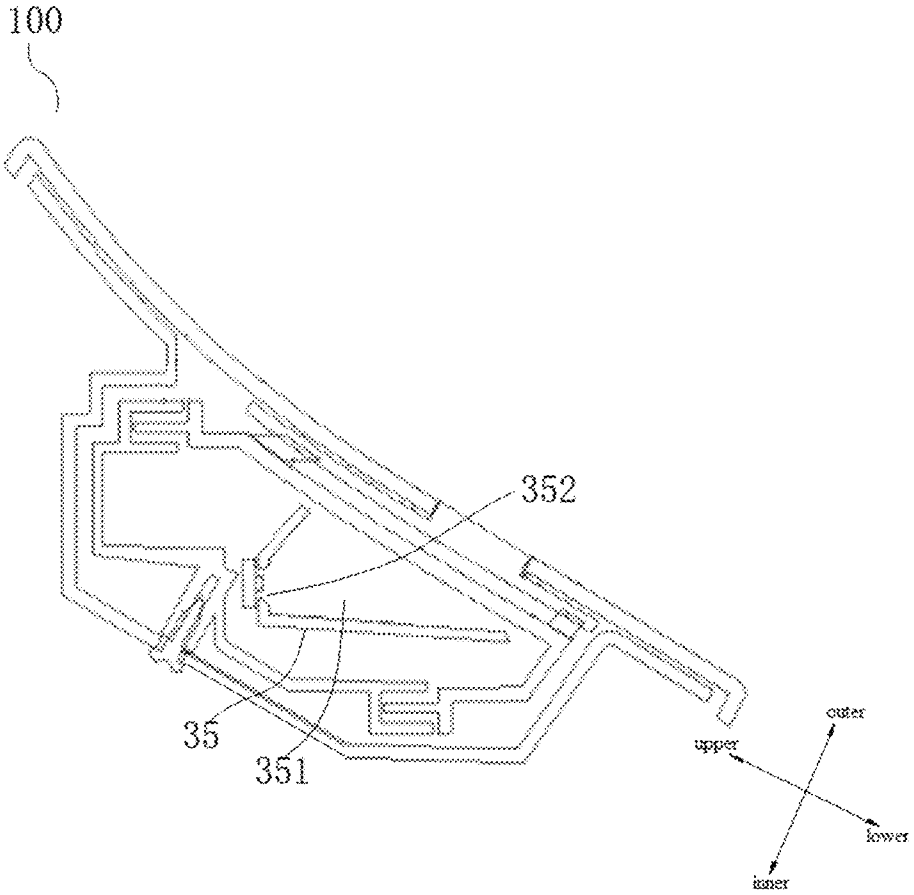
FIG. 2 is a sectional schematic diagram of a through lamp for a vehicle according to another embodiment of the present disclosure.

Specifically, as illustrated in FIG. 2, the light-emitting assembly 3 includes the reflecting rack 35 and the light source 31. The reflecting rack 35 is located at the inner side of the light-transmitting area 12, and the reflecting rack 35 has the reflecting groove 351 with the opening facing the outside. The groove bottom of the reflecting groove 351 defines the through hole 352, and the light source 31 is arranged in the through hole 352. A part of the light emitted by the light source 31 emits from the through hole 352 to the light-transmitting area 12 located at the outside, and another part of the light emitted by the light source 31 is reflected to the light-transmitting area 12 by a side wall of the reflecting groove 351. Therefore, the reflecting rack may improve the brightness of the illumination of the light source towards the light-transmitting area.

In some embodiments, the exterior trim panel 1 is provided with a non-light-transmitting area 13, and the non-light-transmitting area 13 includes at least one of an opaque PP plate, an opaque PC plate, and an opaque PMMA plate. The light-transmitting area 12 includes at least one of a transparent PP plate, a transparent PC plate, and a transparent PMMA plate.

It should be noted that embodiments of the present disclosure does not limit the coupling between the light-transmitting area and the non-light-transmitting area. For example, the light-transmitting area and the non-light-transmitting area may be integrally formed by double-shot moulding to achieve the coupling between the light-transmitting area and the non-light-transmitting area. The light-transmitting area and the non-light-transmitting area may also be coupled by welding, or may also be bonded by an adhesive material, a hot melting coupling and a snap-fit.

It may be understood that the light-transmitting area 12 and the non-light-transmitting area 13 may also be achieved through laser carving process after painting on the transparent PP plate.

In some embodiments, the light-emitting assembly 3 includes a plurality of light sources 31, and the plurality of light sources are spaced apart from each other in the lamp chamber.

Specifically, the plurality of light sources light sources 31 are spaced apart along the left and right direction, and the light emitted by the plurality of light sources 31 is emitted outwards through the light-transmitting area 12. In this way, the weight of the through lamp is lighter by omitting the light guiding member.

In some embodiments, the through lamp 100 for the vehicle further includes a lamp body 4 and an external lens 5. The lamp body 4 and the external lens 5 are arranged in the lamp chamber 21 and coupled to each other to form a closed cavity 41. The light-emitting assembly 3 is arranged in the closed cavity 41 and the light of the light-emitting assembly 3 is emitted towards the light-transmitting area 12 via the external lens 5.

Specifically, as illustrated in FIGS. 1 and 2, the through lamp 100 for the vehicle further includes the lamp body 4 and the external lens 5. The lamp body 4 is coupled to the mounting bracket 2, and the lamp body 4 defines a lamp groove with an opening outwards. The external lens 5 is arranged at an outer side of the lamp body 4, and fitted with the lamp body 4 to seal the lamp groove to form the closed cavity 41. The light-emitting assembly 3 is arranged in the closed cavity 41. The light of the light-emitting assembly 3 is emitted towards the light-transmitting area via the external lens 5. In this way, the lamp chamber and the closed cavity may form two layers of sealing for the light-emitting assembly, and the through lamp has a high waterproof effect.

Furthermore, a sealing member 6 is arranged between the external lens 5 and the inner surface 11 of the exterior trim panel 1. The sealing member 6 extends along a circumference of the light-transmitting area 12 and is enclosed in one circle to form a sealing cavity 61 together with the external lens 5 and the exterior trim panel 1. In this way, it may prevent water vapor from entering the sealing cavity when water vapor enters the lamp chamber, ensuring that the light of the light-emitting assembly is not disturbed during propagation.

Embodiments of the present disclosure also provide a vehicle. The vehicle includes a through lamp, and the through lamp is a through lamp 100 for the vehicle in any of the above embodiments.

Compared with the related art, the vehicle in embodiments of the present disclosure is lightweight and cost-effective, and simultaneously, the vehicle has minor harm to a pedestrian when the collision occurs, resulting in a higher safety.

A through lamp for a vehicle of embodiments of the present disclosure includes an exterior trim panel provided with a light-transmitting area: an mounting bracket arranged on an inner surface of the exterior trim panel, a lamp chamber being defined between the mounting bracket and the inner surface of the exterior trim panel; and a light-emitting assembly arranged in the lamp chamber. Light emitted by the light-emitting assembly is emitted outwards through the light-transmitting area.

In some embodiments, the light-emitting assembly includes a light source and a light guiding member, and the light guiding member is configured to guide the light emitted by the light source to the light-transmitting area.

In some embodiments, the light guiding member is a reflecting mirror, and the reflecting mirror is adapted to reflect the light of the light source to the light-transmitting area.

In some embodiments, the reflecting mirror is coupled to the mounting bracket, the light source is mounted at an upper side of the reflecting mirror, and the light-transmitting area is located at a lower side of the light source meanwhile. The light emitted by the light source is reflected to the light-transmitting area located at the lower side of the light source by the reflecting mirror.

In some embodiments, the light guiding member is a light guide, and the light source is arranged at at least one end of the light guide. The light guide is provided with a light guiding tooth configured to emit the light in the light guide towards an outside of the light guide.

In some embodiments, a plurality of light guides are provided, the plurality of light guides are spaced apart, and the light source is arranged at at least one end of any one of the plurality of light guides.

In some embodiments, the light source is arranged at a junction of any two light guides of the plurality of light guides.

In some embodiments, the light guide includes a first light guide and a second light guide are spaced apart along a left and right direction, and the first light guide and the second light guide extend substantially along the left and right direction. A second end of the first light guide is coupled to a first end of the second light guide, the second end of the first light guide has a first bending portion bent inwards, and the first end of the second light guide has a second bending portion bent inwards. The light source is arranged at an inner side of the first bending portion and the second bending portion. A part of the light emitted by the light source propagates towards a left and right extended part of the first light guide via the first bending portion, and emits towards an outside of the first light guide at the light guiding tooth. Another part of the light emitted by the light source propagates towards a left and right extended part of the second light guide via the second bending portion, and emits towards an outside of the second light guide at the light guiding tooth.

In some embodiments, the light-emitting assembly includes a reflecting rack and a light source. The reflecting rack has a reflecting groove with an opening facing the light-transmitting area, and the reflecting groove is configured to reflect the light emitted by the light source in a direction of the opening of the reflecting groove. The light source is arranged away from an end of the opening of the reflecting rack. A groove bottom of the reflecting groove defines a through hole, and the light emitted by the light source emits from the through hole towards the light-transmitting area.

In some embodiments, the exterior trim panel is provided with a non-light-transmitting area, and the non-light-transmitting area includes at least one of an opaque PP plate, an opaque PC plate, and an opaque PMMA plate. The light-transmitting area includes at least one of a transparent PP plate, a transparent PC plate, and a transparent PMMA plate.

In some embodiments, the light-emitting assembly includes a plurality of light sources, and the plurality of light sources are arranged spaced apart from each other in the lamp chamber.

In some embodiments, the through lamp for the vehicle also includes a lamp body and an external lens. The lamp body and the external lens are arranged in the lamp chamber and coupled to each other to form a closed cavity; the light-emitting assembly is arranged in the closed cavity, and the light of the light-emitting assembly emits towards the light-transmitting area via the external lens.

In some embodiments, a sealing member is arranged between the external lens and the inner surface of the exterior trim panel, and the sealing member extends along a circumference of the light-transmitting area and is enclosed in one circle to form a sealing cavity together with the external lens and the exterior trim panel.

Embodiments of the present disclosure also provide a vehicle having the through lamp for the vehicle as described above. The vehicle includes a through lamp, and the through lamp is a through lamp for the vehicle in any of the above embodiments.

In the description of the present disclosure, it should be understood that orientations or position relationships indicated by terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientations or position relationships illustrated in the accompanying drawings, and are only for convenience of describing the present disclosure and simplifying the description, rather than indicating or implying that devices or components referred to must have a particular orientation, be constructed and operated in the particular orientation. Therefore, it cannot be understood as a limitation on the present disclosure.

In addition, terms "first" and "second" are only used to describe the purpose and cannot be understood as indicating or implying relative importance or implying the quantity of technical features indicated. Therefore, features limited to "first" and "second" may explicitly or implicitly include at least one of these features. In the description disclosed herein, "a plurality of" means at least two, such as two, three, etc., unless otherwise specified with specific limitations.

In the present disclosure, unless otherwise specified and limited, terms "mount", "couple", "connect", "fix" and other terms should be broadly understood. For example, they may be a fixed connection, a detachable connection, or integrated. They may also be a mechanical connection, an electrical connection or communication with each other. They may be directly coupled or indirectly coupled through an intermediate medium. They may be an internal connection of two components or an interaction relationship between two components, unless otherwise specified. For ordinary those skilled in the art, specific meanings of the above terms in the present disclosure may be understood based on specific cases.

In the present disclosure, unless otherwise specified and limited, the first feature is "above" or "below" the second feature, which means that the first feature may be in direct contact with the second features, or the first feature may be in indirect contact with the second features through an intermediate media. Moreover, if the first feature is "on", "above" and "on top of" the second feature, which means that the first feature is directly or diagonally above the second feature, or simply indicates that the first feature is horizontally higher than the second feature. The first feature is "under", "below" and "on bottom of" the second feature, which means that the first feature is directly or diagonally below the second feature, or simply indicates that the horizontal height of the first feature is less than that of the second feature.

In the present disclosure, terms "an embodiment", "some embodiments", "an example", "a specific examples", or "some examples" means that a specific feature, structure, material, or characteristic described in connection with embodiments or examples is included in at least one embodiment or example of the present disclosure. In this specification, the illustrative expressions of the above terms do not necessarily refer to the same embodiments or examples. Moreover, the specific feature, structure, material, or characteristic described may be combined in any suitable manner in one or more embodiments or examples. In addition, those skilled in the art may connect and combine different embodiments or examples as well as features of different embodiments or examples described in this specification, without conflicting with each other.

Although embodiments of the present disclosure have been illustrated and described above, it may be understood that the above embodiments are illustrative and cannot be understood as a limitation of the present disclosure. Those ordinary skilled in the art may make changes, modifications, alternatives, and variations to the above embodiments within the scope of the present disclosure.

All embodiments of the present disclosure may be executed separately or in combination with other embodiments, all of which are considered within the scope of protection required by the present disclosure.

What is claimed is:

1. A vehicle, comprising:

a through lamp comprising:

an exterior trim panel provided with a light-transmitting area;

a mounting bracket arranged on an inner surface of the exterior trim panel, a lamp chamber being defined between the mounting bracket and the inner surface of the exterior trim panel; and a light-emitting assembly arranged in the lamp chamber, wherein light emitted by the light-emitting assembly is emitted outwards through the light-transmitting area, wherein the exterior trim panel is a wiper cover panel, the wiper cover panel covers at least a portion of a wiper, and the wiper cover panel is mounted on an end of the engine hood panel near a windshield, wherein the light-emitting assembly comprises a light source and a light guiding member, and the light guiding member is configured to guide the light emitted by the light source to the light-transmitting area, wherein the light guiding member is a reflecting mirror, and the reflecting mirror is adapted to reflect the light of the light source to the light-transmitting area, and wherein the reflecting mirror is coupled to the mounting bracket, the light source is mounted at an upper side of the reflecting mirror, the light-transmitting area is located at a lower side of the light source meanwhile, and the light emitted by the light source is reflected to the light-transmitting area located at the lower side of the light source by the reflecting mirror.

2. A through lamp for a vehicle, comprising:

an exterior trim panel provided with a light-transmitting area;

a mounting bracket arranged on an inner surface of the exterior trim panel, a lamp chamber being defined between the mounting bracket and the inner surface of the exterior trim panel; and a light-emitting assembly arranged in the lamp chamber, wherein light emitted by the light-emitting assembly is emitted outwards through the light-transmitting area, wherein the exterior trim panel is a wiper cover panel, the wiper cover panel covers at least a portion of a wiper, and the wiper cover panel is mounted on an end of the engine hood panel near a windshield, wherein the light-emitting assembly comprises a light source and a light guiding member, and the light guiding member is configured to guide the light emitted by the light source to the light-transmitting area, wherein the light guiding member is a reflecting mirror, and the reflecting mirror is adapted to reflect the light of the light source to the light-transmitting area, and wherein the reflecting mirror is coupled to the mounting bracket, the light source is mounted at an upper side of the reflecting mirror, the light-transmitting area is located at a lower side of the light source meanwhile, and the light emitted by the light source is reflected to the light-transmitting area located at the lower side of the light source by the reflecting mirror.

3. The through lamp for the vehicle according to claim 2, wherein the mounting bracket is mounted at an inner side of the exterior trim panel, the mounting bracket defines a groove, and the exterior trim panel closes the groove and forms the lamp chamber.

4. The through lamp for the vehicle according to claim 2, wherein the exterior trim panel is provided with a non-light-transmitting area, the non-light-transmitting area comprises at least one of an opaque PP plate, an opaque PC plate, and an opaque PMMA plate, and the light-transmitting area includes at least one of a transparent PP plate, a transparent PC plate, and a transparent PMMA plate.

5. The through lamp for the vehicle according to claim 2, wherein the light guiding member is a light guide, the light source is arranged at at least one end of the light guide, and the light guide is provided with a light guiding tooth configured to emit the light in the light guide towards an outside of the light guide.

6. The through lamp for the vehicle according to claim 5, wherein a plurality of light guides are provided, the plurality of light guides are spaced apart, and the light source is arranged at at least one end of any one of the plurality of light guides.

7. The through lamp for the vehicle according to claim 6, wherein the light source is arranged at a junction of any two light guides of the plurality of light guides.

8. The through lamp for the vehicle according to claim 7, wherein the light guide comprises a first light guide and a second light guide spaced apart along a left and right direction, and the first light guide and the second light guide extend substantially along the left and right direction; a second end of the first light guide is coupled to a first end of the second light guide, the second end of the first light guide has a first bending portion bent inwards, and the first end of the second light guide has a second bending portion bent inwards; and the light source is arranged at an inner side of the first bending portion and the second bending portion, a part of the light emitted by the light source propagates towards a left and right extended part of the first light guide via the first bending portion, and emits towards an outside of the first light guide at the light guiding tooth, and another part of the light emitted by the light source propagates towards a left and right extended part of the second light guide via the second bending portion, and emits towards an outside of the second light guide at the light guiding tooth.

9. The through lamp for the vehicle according to claim 2, wherein the light-emitting assembly comprises a reflecting rack and a light source, the reflecting rack has a reflecting groove with an opening facing the light-transmitting area, the reflecting groove is configured to reflect the light emitted by the light source in a direction of the opening of the reflecting groove, the light source is arranged away from an end of the opening of the reflecting rack, a groove bottom of the reflecting groove defines a through hole, and the light emitted by the light source emits from the through hole towards the light-transmitting area.

10. The through lamp for the vehicle according to claim 9, wherein the reflecting rack is located at an inner side of the light-transmitting area, and the light source is arranged in the through hole; and a part of the light emitted by the light source emits from the through hole to the light-transmitting area located at an outside, and another part of the light emitted by the light source is reflected to the light-transmitting area by a side wall of the reflecting groove.

11. The through lamp for the vehicle according to claim 2, wherein the light-emitting assembly comprises a plurality of light sources, and the plurality of light sources are spaced apart from each other in the lamp chamber.

12. The through lamp for the vehicle according to claim 2, further comprising a lamp body and an external lens, wherein the lamp body and the external lens are arranged in the lamp chamber and coupled to each other to form a closed cavity, the light-emitting assembly is arranged in the closed cavity, and the light of the light-emitting assembly is emitted towards the light-transmitting area via the external lens.

13. The through lamp for the vehicle according to claim 12, wherein a sealing member is arranged between the external lens and the inner surface of the exterior trim panel, and the sealing member extends along a circumference of the light-transmitting area and is enclosed in one circle to form a sealing cavity together with the external lens and the exterior trim panel.

14. The through lamp for the vehicle according to claim 12, wherein the lamp body is coupled to the mounting bracket, the lamp body defines a lamp groove with an opening outwards, and the external lens is arranged at an outer side of the lamp body and fitted with the lamp body to seal the lamp groove to form the closed cavity.

15. The through lamp for the vehicle according to claim 2, wherein the exterior trim panel is provided with a non-light-transmitting area, and the non-light-transmitting area is defined by a painted area of a transparent PP plate.

* * * * *